(12) United States Patent
Kholwadwala et al.

(10) Patent No.: US 7,246,524 B1
(45) Date of Patent: Jul. 24, 2007

(54) MEMS FLUIDIC ACTUATOR

(75) Inventors: Deepesh K. Kholwadwala, Albuquerque, NM (US); Gabriel A. Johnston, Trophy Club, TX (US); Brandon R. Rohrer, Albuquerque, NM (US); Paul C. Galambos, Albuquerque, NM (US); Murat Okandan, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 147 days.

(21) Appl. No.: 11/120,843

(22) Filed: May 2, 2005

(51) Int. Cl.
*G01L 7/08* (2006.01)

(52) U.S. Cl. ...................................... 73/715

(58) Field of Classification Search ................. 702/45; 264/401; 73/146, 504.15, 540.12, 715; 257/416
See application file for complete search history.

(56) References Cited

U.S. PATENT DOCUMENTS

| | | | |
|---|---|---|---|
| 5,374,011 A | 12/1994 | Lazarus et al. | |
| 5,596,781 A | 1/1997 | Graebe | |
| 5,657,499 A | 8/1997 | Vaughn et al. | |
| 5,662,294 A | 9/1997 | Maclean et al. | |
| 5,755,408 A | 5/1998 | Schmidt et al. | |
| 5,887,828 A | 3/1999 | Appa | |
| 6,209,824 B1 | 4/2001 | Caton et al. | |
| 6,255,757 B1 | 7/2001 | Dhuler et al. | |
| 6,443,179 B1 | 9/2002 | Benavides et al. | |
| 6,537,437 B1 | 3/2003 | Galambos et al. | |
| 6,590,267 B1 | 7/2003 | Goodwin-Johansson et al. | |
| 6,612,535 B1 | 9/2003 | Tai et al. | |
| 6,662,642 B2 * | 12/2003 | Breed et al. | ................... 73/146 |
| 6,782,573 B2 | 8/2004 | Odderson | |
| 6,836,736 B2 * | 12/2004 | Allen et al. | ................... 702/45 |
| 6,918,297 B2 * | 7/2005 | MacGugan | ............... 73/504.15 |
| 2004/0008853 A1 * | 1/2004 | Pelrine et al. | ............... 381/191 |
| 2005/0107738 A1 * | 5/2005 | Slater et al. | ............. 604/96.01 |

OTHER PUBLICATIONS

Mueller, et al, "An Overview of MEMS-Based Micropropulsion Developments at JPL" Acta Astronautica, vol. 52, Issue 9, 2003, pp. 881-895.

* cited by examiner

*Primary Examiner*—Jewel Thompson
(74) *Attorney, Agent, or Firm*—William R. Conley

(57) ABSTRACT

The present invention comprises a novel, lightweight, massively parallel device comprising microelectromechanical (MEMS) fluidic actuators, to reconfigure the profile, of a surface. Each microfluidic actuator comprises an independent bladder that can act as both a sensor and an actuator. A MEMS sensor, and a MEMS valve within each microfluidic actuator, operate cooperatively to monitor the fluid within each bladder, and regulate the flow of the fluid entering and exiting each bladder. When adjacently spaced in a array, microfluidic actuators can create arbitrary surface profiles in response to a change in the operating environment of the surface. In an embodiment of the invention, the profile of an airfoil is controlled by independent extension and contraction of a plurality of actuators, that operate to displace a compliant cover.

8 Claims, 11 Drawing Sheets

Section A - A

US 7,246,524 B1

MEMS FLUIDIC ACTUATOR

STATEMENT REGARDING FEDERALLY SPONSORED RESEARCH OR DEVELOPMENT

The United States Government has certain rights in this invention pursuant to Department of Energy Contract No. DE-AC04-94AL85000 with Sandia Corporation.

FIELD OF THE INVENTION

The present invention generally relates to Microelectromechanical (MEMS) fluidic actuators, and surfaces that can be reconfigured through the action of a system of MEMS fluidic actuators.

BACKGROUND OF THE INVENTION

In aerial vehicles, fixed profile airfoils are typically employed having a design that is optimized for performance within a primary flight condition. These fixed profile airfoils are then sub-optimal in many other operating conditions that may include take-off, landing, maneuvering and dual-mode cruising velocities. Modern aircraft are required to maneuver efficiently over super-sonic and sub-sonic flight conditions. What is needed is a means for replacing or modifying the conventional fixed profile control surfaces of an aircraft with controlled reconfigurable surfaces, for which the profile of an airfoil can be adjusted on demand, to maintain optimal performance of a vehicle as flight conditions change. The present invention presents a solution to this problem by providing a novel, lightweight, massively parallel device comprising microfluidic actuators, to sense, control and reconfigure the profile of a surface.

BRIEF DESCRIPTION OF THE DRAWINGS

The accompanying drawings, which are incorporated in and form part of the specification, illustrate several embodiments of the present invention and, together with the description, serve to explain the principles of the invention. The drawings provided herein are not drawn to scale.

DETAILED DESCRIPTION OF THE INVENTION

Figure 1A:
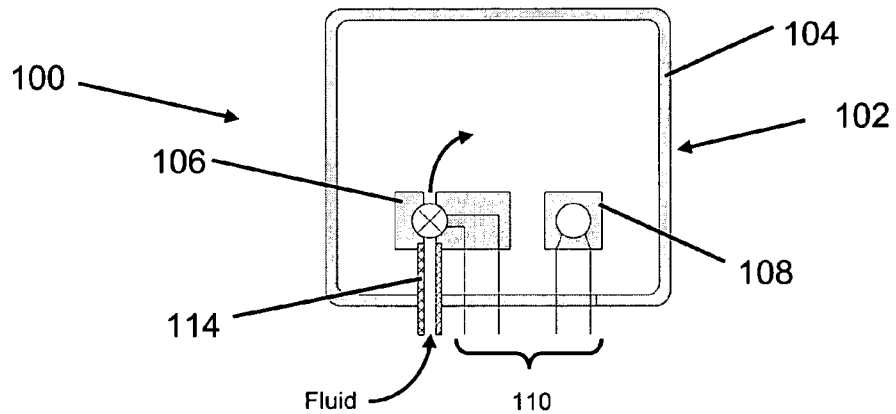
FIG. 1A is a schematic illustration of an embodiment of a MEMS fluidic actuator according to the present invention.

FIG. 1A is a schematic illustration of an embodiment of a MEMS fluidic actuator 100 according to the present invention. MEMS fluidic actuator 100 includes a bladder 102 comprising an elastic membrane 104. Disposed within the bladder 102 are MEMS valve 106 and MEMS sensor 108. Membrane 104 can completely enclose MEMS valve 106 and sensor 108. MEMS sensor 108 can be configured to monitor the pressure of a fluid within the bladder 102, the temperature, velocity and/or flow rate of fluid into and out of the bladder 102, or other desired property of the fluid within the bladder. Additionally one or more MEMS sensors can be configured to measure any combination of properties (temperature, pressure, velocity, flow rate etc.) of a fluid within, or flowing into or out of bladder 102. MEMS valve 106 can be configured to control the flow of fluid into, and out of, the bladder 102. MEMS valve 106 may be a two-way valve. Alternatively, MEMS valve 106 may be a one-way valve. Alternatively, actuator 100 may comprise a pair (not shown) of one-way valves disposed inside of bladder 102, for independently controlling the flow of fluid in and out of bladder 102. Electrical power and control signals 110 for the operation of the MEMS valve 106 and the MEMS sensor 108 can be connected to a controller (not shown) via feedthroughs (not shown) in the wall of the bladder that can be made by conventional means. Fluid is supplied to bladder 102 from a source of fluid (not shown), by way of the MEMS valve 106 and plumbing means 114 that can include piping, tubing and/or fluidic channels. Penetration of plumbing means 114 through the bladder 102, and sealing of plumbing means 114 to the bladder can be made by conventional methods. Bladder 102 can comprise an elastic material. Admitting fluid into bladder 102 causes the MEMS fluidic actuator 100 to expand. In a similar fashion, withdrawing fluid from bladder 102 causes the MEMS fluidic actuator 100 to contract.

Figure 1B:
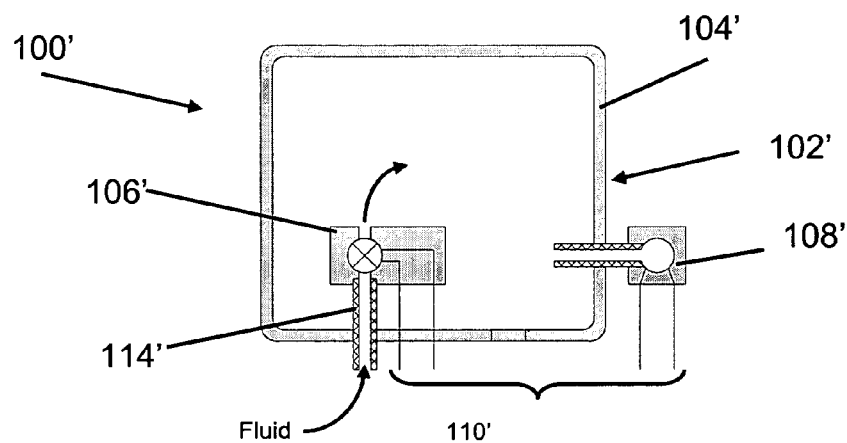
FIG. 1B is a schematic illustration of another embodiment of a MEMS fluidic actuator according to the present invention.

FIG. 1B is a schematic illustration of another embodiment of a MEMS fluidic actuator 100' according to the present invention. MEMS fluidic actuator 100' includes a bladder 102' comprising an elastic membrane 104'. Disposed within the bladder 102' is a MEMS valve 106'. A MEMS sensor 108' can be disposed exteriorly of, and fluidically connected to, the bladder 102'. MEMS sensor 108' can be configured to monitor the pressure of a fluid within the bladder 102', the temperature, velocity and/or flow rate of fluid into and out of the bladder 102', or other desired property of the fluid within the bladder. MEMS valve 106' can be configured to control the flow of fluid into, and out of, the bladder 102'. MEMS valve 106' may be a two-way valve. Alternatively, MEMS valve 106' may be a one-way valve. Alternatively, actuator 100' may comprise a pair (not shown) of one-way valves disposed inside of bladder 102', for independently controlling the flow of fluid in and out of bladder 102'. Electrical power and control signals 110' for the operation of the MEMS valve 106' and the MEMS sensor 108' can be connected to a controller (not shown) using where needed, feedthroughs (not shown) in the wall of the bladder that can be made by conventional means. Fluid is supplied to bladder 102' from a source of fluid (not shown), by way of the MEMS valve 106' and plumbing means 114' that can include piping, tubing or fluidic channels. Penetration of plumbing means 114' through the bladder 102', and sealing of plumbing means 114' to the bladder can be made by conventional methods.

Figure 1C:
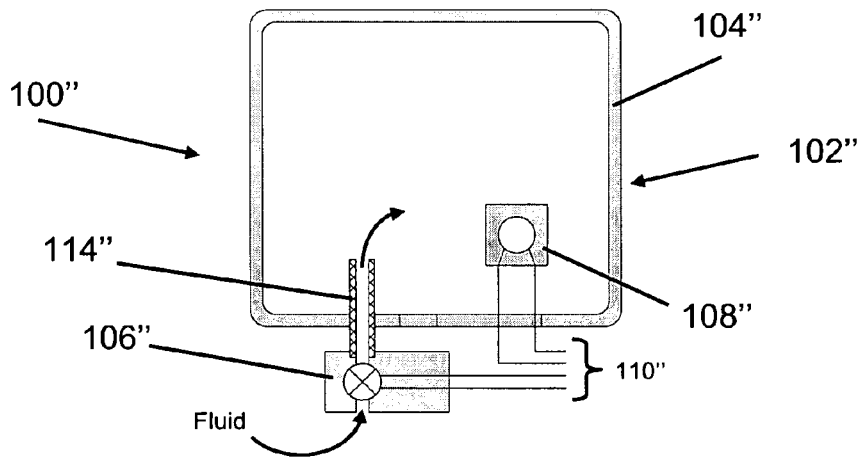
FIG. 1C is a schematic illustration of another embodiment of a MEMS fluidic actuator according to the present invention.

FIG. 1C is a schematic illustration of another embodiment of a MEMS fluidic actuator 100" according to the present invention. MEMS fluidic actuator 100" includes a bladder 102" comprising an elastic membrane 104". Disposed within the bladder 102" is a MEMS sensor 108" that can be configured to monitor the pressure of a fluid within the bladder 102", the temperature, velocity and/or flow rate of fluid into and out of the bladder 102", or other desired property of the fluid within the bladder. MEMS valve 106" can be mounted exteriorly of the bladder 102" and can be configured to control the flow of fluid into, and out of, the bladder 102". MEMS valve 106" may be a two-way valve. Alternatively, MEMS valve 106" may be a one-way valve. Alternatively, actuator 100" may comprise a pair (not shown) of one-way valves, for independently controlling the flow of fluid in and out of bladder 102". Electrical power and control signals 110" for the operation of the MEMS valve 106" and the MEMS sensor 108" can be connected to a controller (not shown) using where needed, feedthroughs (not shown) in the wall of the bladder that can be made by conventional means. Fluid is supplied to bladder 102" from a source of fluid (not shown), by way of the MEMS valve 106" and plumbing means 114" that can include piping, tubing or fluidic channels. Penetration of plumbing means 114" through the bladder 102", and sealing of plumbing means 114" to the bladder can be made by conventional methods.

Figure 2:
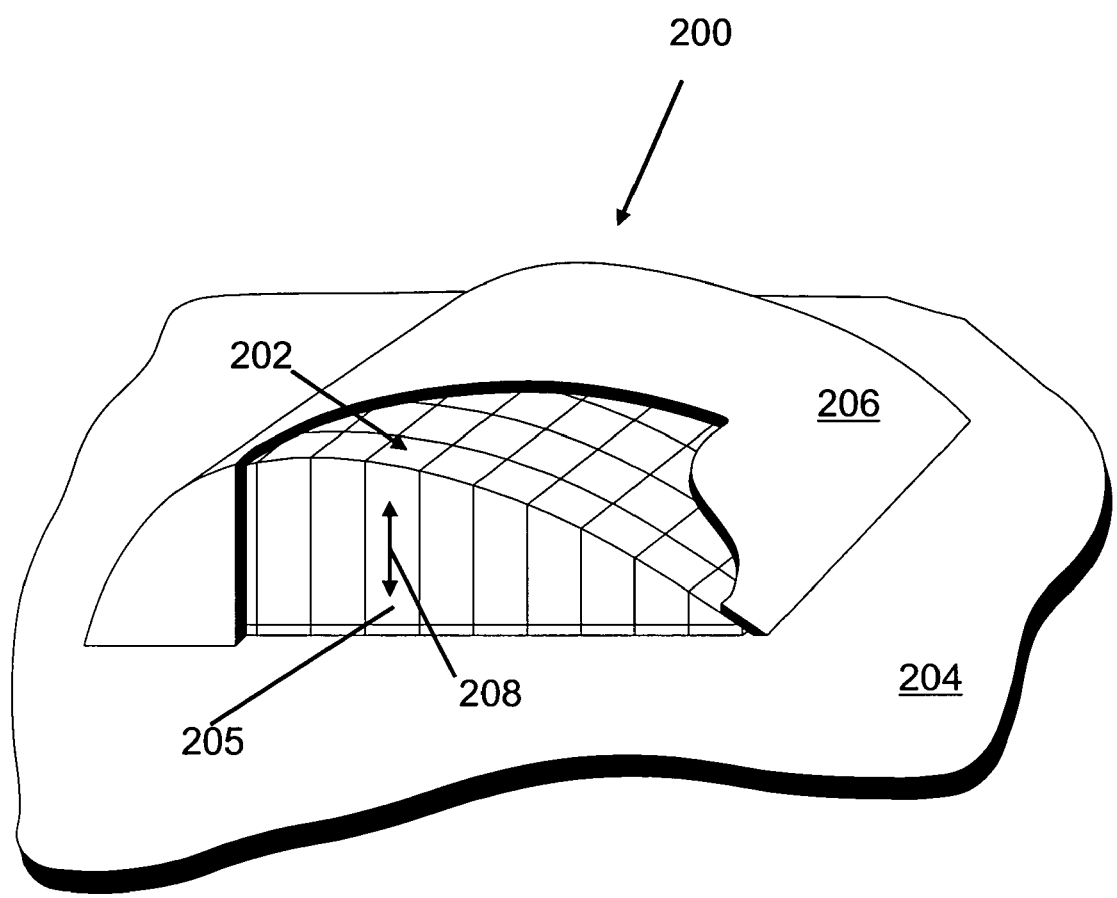
FIG. 2 is a schematic illustration of an embodiment of a system of MEMS fluidic actuators according to the present invention.

FIG. 2 is a schematic illustration of an embodiment of a system of MEMS actuators 200, according to the present invention. System 200 comprises a plurality of adjacently spaced MEMS fluidic actuators 202, mounted to the surface of a substrate 204. Each MEMS fluidic actuator 202 comprises an expandable bladder 205 that can be independently extended or contracted in a direction along an axis 208, substantially perpendicular to the surface of substrate 204. A compliant cover 206, can be joined to substrate 204, extending over and being displaceable by, a plurality of MEMS fluidic actuators 202. Extension of each MEMS fluidic actuator 202, can be independently controlled by regulating the pressure and/or volume of a fluid (e.g. a liquid or a gas) entering and exiting each bladder 205. The bladder 205 can comprises an elastic material that provides a restoring force for contracting the bladder.

Admitting fluid into a bladder 205 causes the MEMS fluidic actuator 202 to extend, substantially along axis 208, urging compliant cover 206 to be displaced away from substrate 204. In a similar fashion, withdrawing fluid from bladder 205 causes the MEMS fluidic actuator 202 to retract along axis 208, allowing compliant cover 206 to be displaced towards substrate 204. By independently controlling the flow of fluid into and out of a plurality of bladders 205, each actuator 202 can be extended and contracted controlled distances, correspondingly displacing compliant cover 206 a controlled amount, creating virtually any surface profile in the compliant cover 206.

Compliant cover 206 can comprise an elastomeric polymer, rubber, fabric, silk, polymer composite, thin metal or dielectric material that is deformable by the forces generated through the action of the microfluidic actuators 202. Substrate 204 can comprise an airfoil of an aircraft, airfoil of a windmill, propeller or helicopter rotor, or may alternatively comprise an external surface of an aircraft, land, sea or underwater vehicle. The individual microfluidic actuators 202 can be spaced on the surface of substrate 204, so as to allow adjacent bladders 205 to touch along a portion of their sidewalls as illustrated in FIG. 1.

Figure 3:
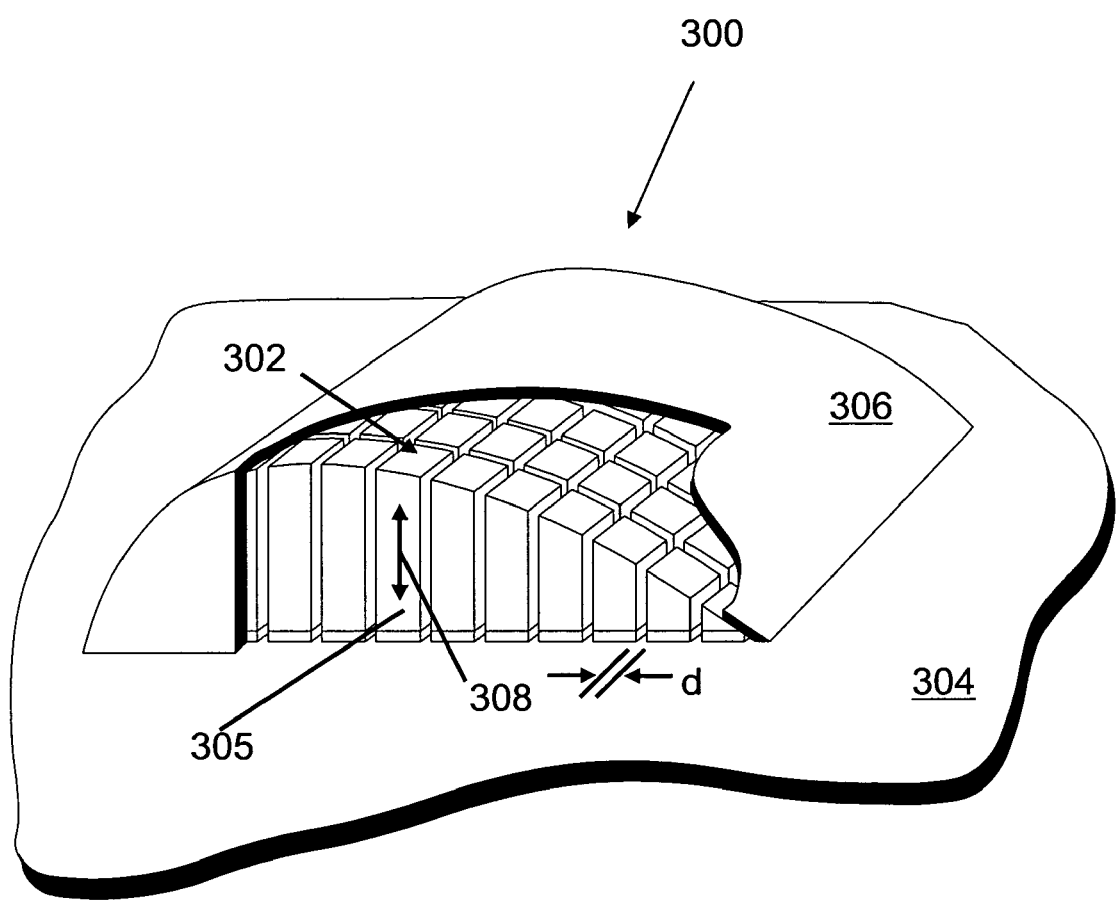
FIG. 3 is a schematic illustration of another embodiment of a system of MEMS fluidic actuators according to the present invention.

FIG. 3 is a schematic illustration of another embodiment of a system of MEMS fluidic actuators 300 according to the present invention, wherein a plurality of microfluidic actuators 302 are spaced so as to maintain a separation, "d", between the sidewalls of neighboring bladders 305. The spacing between actuators can be adjusted to accommodate the needs of a particular application of interest. It has been found in certain embodiments of the invention that spacing the individual actuators 302 so that the sidewalls of adjacent bladders 305 are touching, as shown in FIG. 1, enhances the resolution of the profile created in the compliant cover 306, can reduce "ballooning" of the individual bladders 305, and may enhance the displacement produced by an actuator 302, along axis 308 and substantially perpendicular to the surface of substrate 304.

Figure 4:
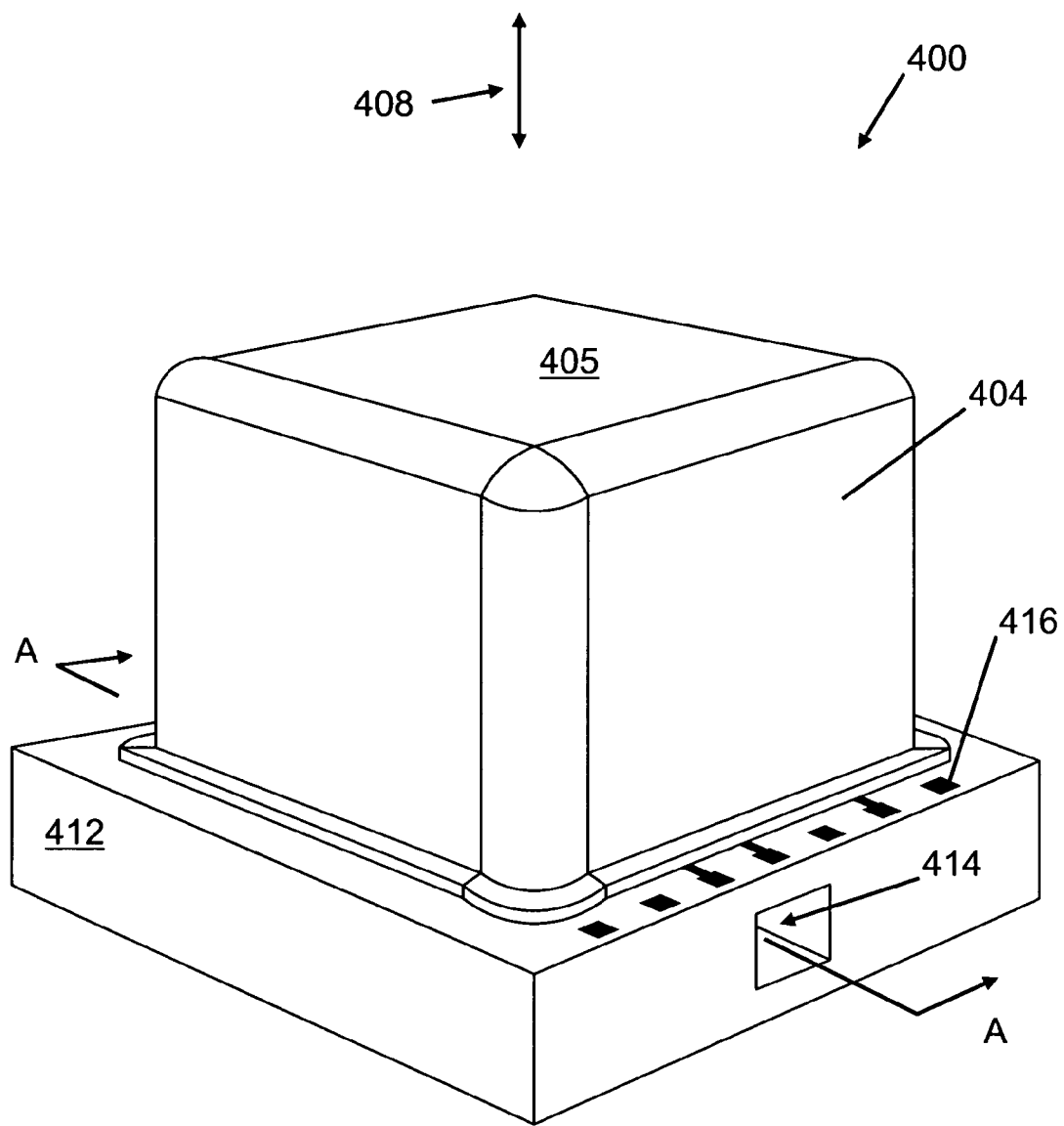
FIG. 4 is a schematic illustration of another embodiment of a MEMS fluidic actuator according to the present invention.

FIG. 4 is a schematic perspective illustration of another embodiment of a MEMS fluidic actuator 400, according to the present invention. The MEMS fluidic actuator 400 comprises a base 412 providing support for a bladder 405 that comprises an elastic membrane 404. Base 412 can be a printed wiring board, and may contain fluidic channels as described in U.S. Pat. No. 6,443,179 to Benavides et al, herein incorporated by reference. Base 412 can have internal fluidic channels 414, for distribution of fluids comprising gases or liquids, between an external reservoir and bladder 405. Base 412 may additionally include electrically conductive traces 416, for communication of electrical power and control signals between MEMS valves and MEMS sensors, and a controller. Base 412 can comprise a ceramic, a silicon substrate, a polymer, a plastic, a glass, a glass-ceramic composite, a glass-polymer composite, a resin material, a fiber reinforced composite, a glass-coated metal, a printed wiring board composition, FR-4, epoxy-glass composite, epoxy-kevlar composite, polyamide, or a fluoropolymer. The elastic membrane 404 can comprise any substantially leak tight, polymeric elastomer (for example: a silicone rubber, natural rubber, latex, neoprene, poly dimethylsiloxane (PDMS) or polyurethane compound) cast or otherwise formed into a relatively thin sheet (for example providing a bladder wall thickness on the order of 10 microns to several millimeters in thickness) and may be formed into a shape as may be desired for bladder 405. As shown in FIG. 4, bladder 405 can have a generally rectangular shape, but other shapes may be utilized in practicing the invention including round, hemispherical, and "blister" or dome shaped cross sections.

Figure 5:
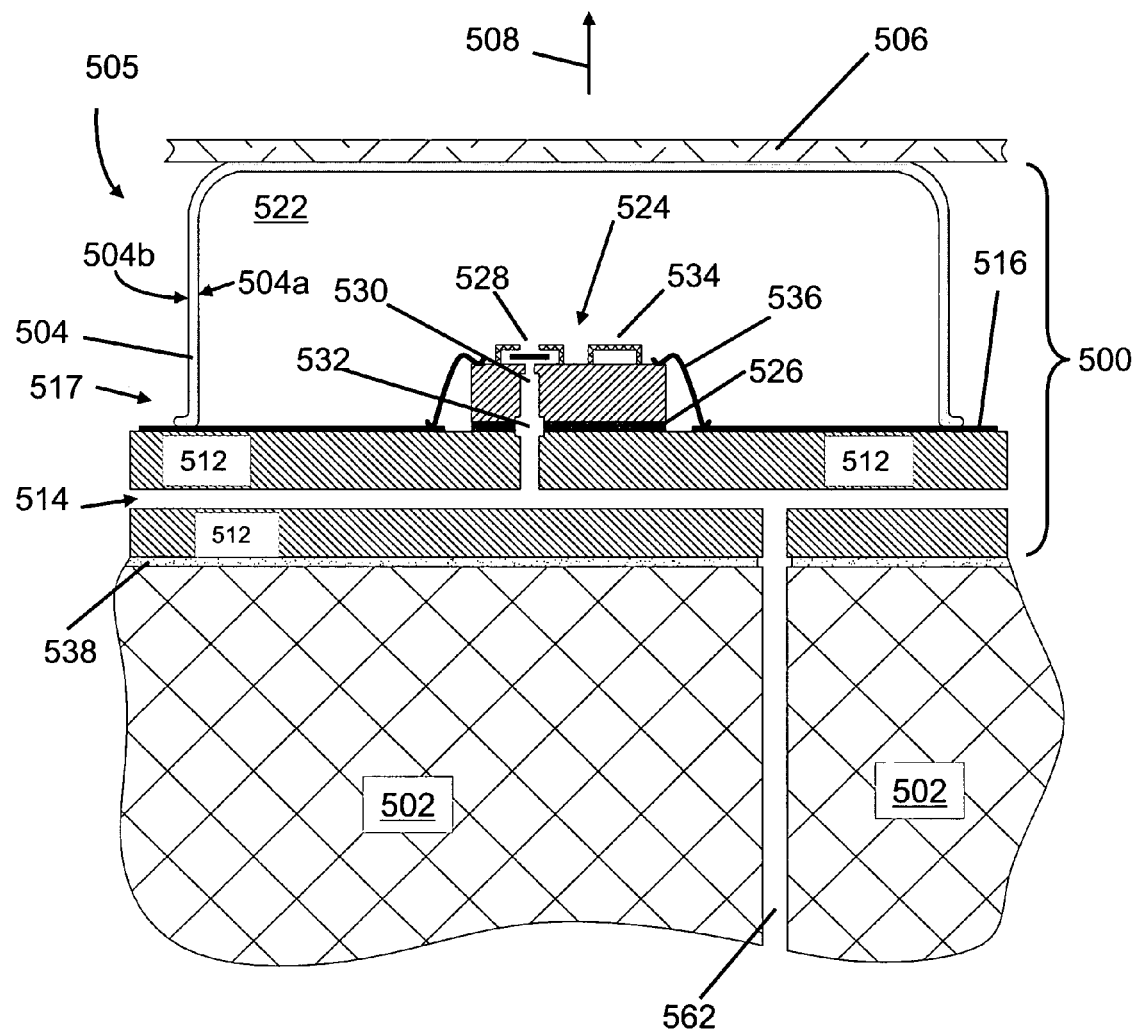
FIG. 5 is a schematic cross-section illustration, along section line A—A, of an embodiment of a MEMS fluidic actuator, as shown in FIG. 4.

FIG. 5 is a schematic cross-section view along section line A—A of the embodiment of a fluidic MEMS actuator 500 as illustrated in FIG. 4, including for reference, portions of a substrate 502 and a compliant cover 506. Fluidic MEMS actuator 500 can be attached to substrate 502 by a joining layer 538, that can comprise an adhesive layer. Compliant cover 506 is in physical contact with the MEMS fluidic actuator 500 along at least a portion of the bladder 505, and can be bonded, for example, by adhesive means (not shown) to bladder 505.

The bladder 505 comprises an elastic membrane 504 having an interior surface 504a and an opposed exterior surface 504b. The perimeter edges 517 of the bladder 505 are attached to the surface of the base 512 thereby enclosing a sealed internal volume 522 between the elastic membrane 504 and the base 512. A MEMS fluidic device 524 is located within the internal volume 522 and can be joined to base 512 by means of an adhesive layer 526. MEMS fluidic device 524 is typically a silicon die and can contain fluidic channels, valves, pumps, pressure sensors, etc. See for example, U.S. Pat. No. 6,537,437 to Galambos et. al, herein incorporated by reference. Microfluidic devices typically have very small fluidic channels, on the order of 1 to 10 µm and have a small overall footprint, on the order of 3 mm×6 mm. Exchange of fluids between the internal volume 522 and a fluidic channel 514 within the base 512 is controlled by a MEMS valve 528 operating to regulate the flow of fluid through a channel 530 within MEMS fluidic device 524, which is fluidically connected to channel 514 by means of a through hole 532, within an adhesive layer 526. A MEMS pressure sensor 534 is located within the internal volume 522 for the purpose of monitoring the pressure of the fluid within the volume 522. In this embodiment, the MEMS pressure sensor 534, and the MEMS valve 528 are incorporated into a singular MEMS device 524.

Configurations of the MEMS valve 528 can include one-way and two-way acting valves constructed in fluidic MEMS device 524 of layers comprising silicon, polysilicon, silicon nitride, silicon oxides, metallic layers, dielectric layers, or polymeric layers. Types of MEMS valves that can be produced include flap valves, disk-in-cage valves, and gate valves and can be mechanically actuated by thermal, piezoelectric or electrostatic means. Such valves can be on the order of 10's of microns in diameter and operate to control the flow of fluids in channels on the order of 1 µm to 10 µm in cross-sectional dimension. Flow rates of a fluid through such valves can be on the order of about 10 cc/s. The MEMS pressure sensor 534 can similarly be constructed in fluidic MEMS device 524 of layers comprising silicon, polysilicon, silicon nitride, silicon oxides, metallic layers, dielectric layers, or polymeric layers. MEMS pressure sensor 534 can be of the deflecting diaphragm type and can include piezo-resistive or capacitive sensing elements. In this embodiment, MEMS device 524 includes a MEMS pressure sensor 534, but it is anticipated other sensing elements may be included within the sealed volume 522 as well. Other sensing elements that can be anticipated are flow sensors, temperature sensors, force transducers, distance measuring devices, etc., as may be constructed from MEMS structures to produce optical, electrical, mechanical and/or magnetic sensors.

Electrical interconnections to the MEMS device 524 to provide power, and communicate control signals for opening and closing MEMS valve 528, and obtaining pressure measurements from sensor 534, can include wirebonds 536 between device 524 and electrical conductors 516. Electrical conductors 516 can be interconnected to a controller (not shown) to provide for independently monitoring and controlling the pressure of fluid within an individual bladder 505, as may be arranged in a plurality. Therefore the extension and contraction of an individual actuator 500, can be controlled by independently adjusting fluid flow entering and exiting a bladder 505, through controlled opening and closing of valve 528. The controller, for example, can comprise a computer, PC, programmable logic device (PLD), CPU or similar instrument for receiving pressure signals from the pressure sensor 534 and providing a control signal to valve 528 in response thereto.

In the operation of a fluidic MEMS actuator 500, where the pressure indicated by the measured output of sensor 534 within the internal volume 522, is less than the pressure of the fluid within channel 514, a control signal can be supplied to valve 528 causing the valve 528 to open, thereby allowing fluid to flow from channel 514, through channel 530, and into the internal volume 522. The accumulation of fluid and therefore the build-up of pressure within the internal volume 522 will cause the bladder 505 to expand and deflect in the general direction 508 as illustrated. The displacement of the bladder 505, driven by the pressure within the internal volume 522, allows for the extraction of useful work from the actuator 500, by causing a displacement of the compliant cover 506, away from substrate 502, in a direction substantially along axis 508. In a like manner, should the pressure within the internal volume 522 be greater than the pressure of fluid within channel 514, a control signal can be supplied to valve 528 causing the valve to open, thereby allowing fluid to flow from the sealed volume 522, through channel 530 and into channel 514. The withdrawal of fluid from the sealed volume 522 will cause the bladder to contract, causing the compliant cover 506 to be displaced towards substrate 502 in a direction generally opposite that indicated by 508. In this embodiment of the invention, microfluidic valve 528 can act as a two-way valve.

The edges 517 of bladder 505 can be attached to base 512 by an adhesive bond, mechanical clamping of the membrane 504 to the base 512, casting the membrane onto the surface of the base, thermal or mechanical fusing a portion of membrane 504 to base 512, or by other common bonding and/or sealing means. Base 512 can be attached to substrate 502 by means of a joining layer 538, that can comprise a liquid adhesive, sheet adhesive, or a double sided adhesive, comprising materials such as a; thermoplastic polymer, thermoset polymer, transfer tape, epoxy, cyanate ester, cyanoacrylates, polyester, polyamide, polyimide, etc. Joining layer 538 can alternatively comprise materials used in soldering, brazing and fusible glass bonding. In other embodiments of the invention, joining layer 538 can be eliminated in part or completely, and replaced with conventional mechanical fastening means including threaded fasteners, clamps or rivets.

Where FIG. 5 is a schematic illustration of an individual fluidic MEMS actuator 500, a system can include a plurality of actuators adjacently disposed on the surface of a substrate as shown in FIGS. 2 and 3. To facilitate the fluidic coupling and transport of fluid to and from an actuator 500 within a system, fluidic channels 562 may be incorporated in the substrate 502.

In FIG. 5, MEMS device 524 is illustrated as being electrically interconnected to electrical conductors 516 on base 512 by wirebonds 536, but other means such as direct chip attach, flip chip, solder bumps or electrically conductive adhesives could be employed as well. Adhesive layer 526 between base 512 and device 524 can comprise a liquid adhesive, sheet adhesive, or a double sided adhesive, comprising materials such as a; thermoplastic polymer, thermoset polymer, transfer tape, epoxy, cyanate ester, cyanoacrylates, polyester, polyamide, polyimide, etc. Alternatively, adhesive layer 526 can comprise materials used in soldering, brazing and fusible glass bonding.

Figure 6:
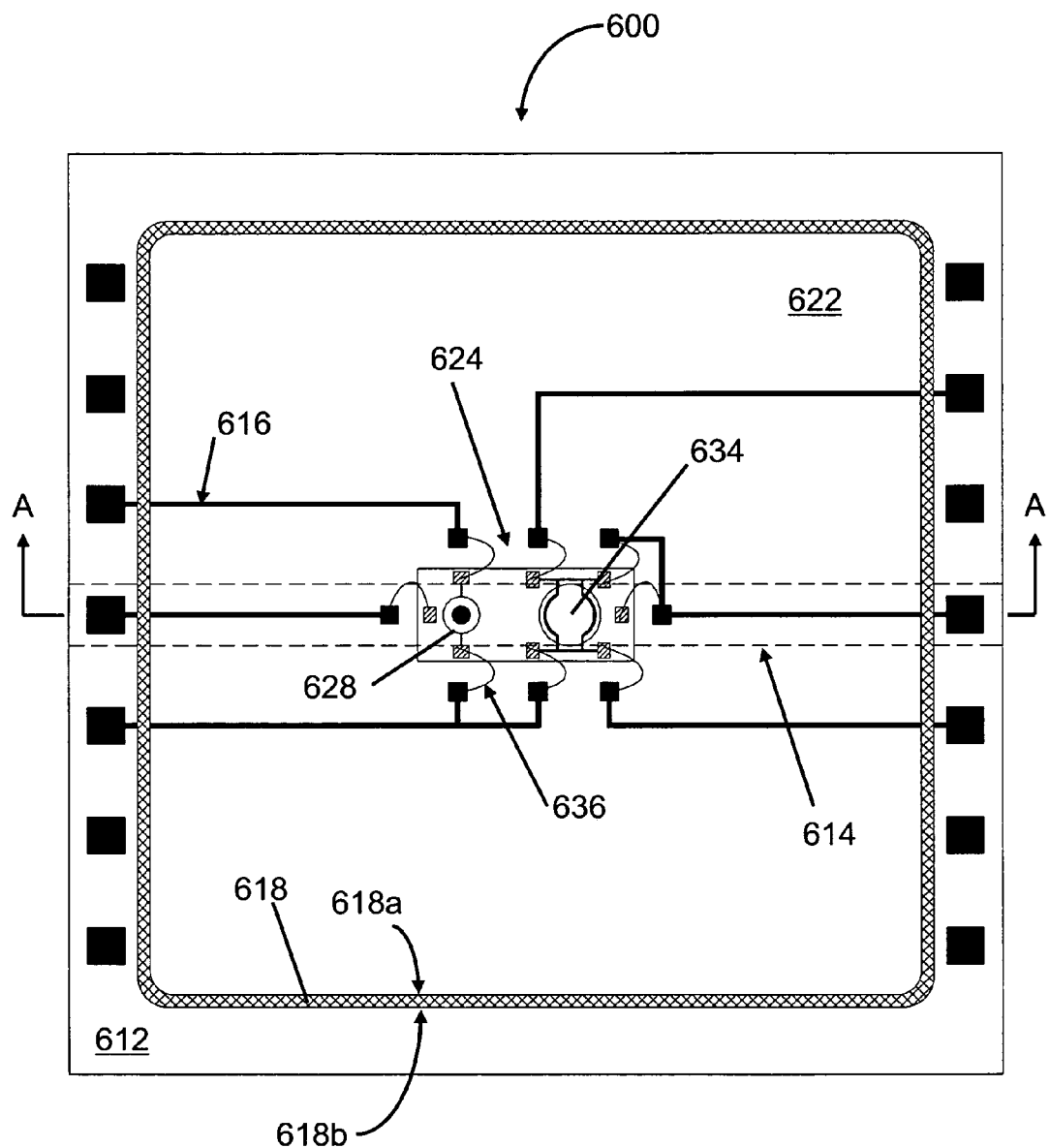
FIG. 6 is a schematic plan view of the internal components of an embodiment of a MEMS fluidic actuator as shown in FIG. 4.

FIG. 6 is a schematic plan view of the internal components of the embodiment of a MEMS fluidic actuator 600, as illustrated in FIG. 5 (the bladder has been removed in this view). The lateral dimensions of the MEMS fluidic device 624 are exaggerated with respect to the base the base 612, to facilitate illustration of the internal workings. The microfluidic device 624 is positioned on base 612 to provide alignment and fluidic coupling of device 624 with a fluidic channel 614 (indicated by dashed lines) within the base 612. MEMS valve 628 regulates the exchange of fluids between the fluidic channel 614 and the internal volume 622 within the actuator 600. A MEMS pressure sensor 634 can be incorporated into device 624 for the purpose of monitoring the pressure of the fluid within the internal volume 622. In this exemplary embodiment, the pressure sensor 634 can comprise a diaphragm sensor having piezo-resistive sense elements arranged in a Wheatstone bridge configuration. And as shown, MEMS valve 628 can comprise a two-way acting flap valve.

Communication of electrical power and control signals to MEMS device 624 can be accomplished through wirebonds 636, between device 624 and electrical conductors 616 on the base 612. A substantially annular seal 618, generally made at the perimeter edge of a bladder, comprises an inner boundary 618a and an outer boundary 618b, for sealing the bladder (not shown) to base 612 and can extend over electrical conductors 616. The low profile of circuit traces utilized as conductors 616 (for example; copper traces on a printed wiring board, screen printed metallization on a ceramic substrate, or deposited metal on a silicon substrate) allows for easily maintaining a seal where a conductor traverses the seal area 618. Electrical conductors 616 are illustrated as being disposed on the surface of base 612, but they could alternatively be located within the body of base 612, as for example, where base 612 comprises a laminated structure (e.g. a low temperature co-fired ceramic, a high temperature co-fired ceramic, a laminate printed wiring board, etc.).

Figure 7:
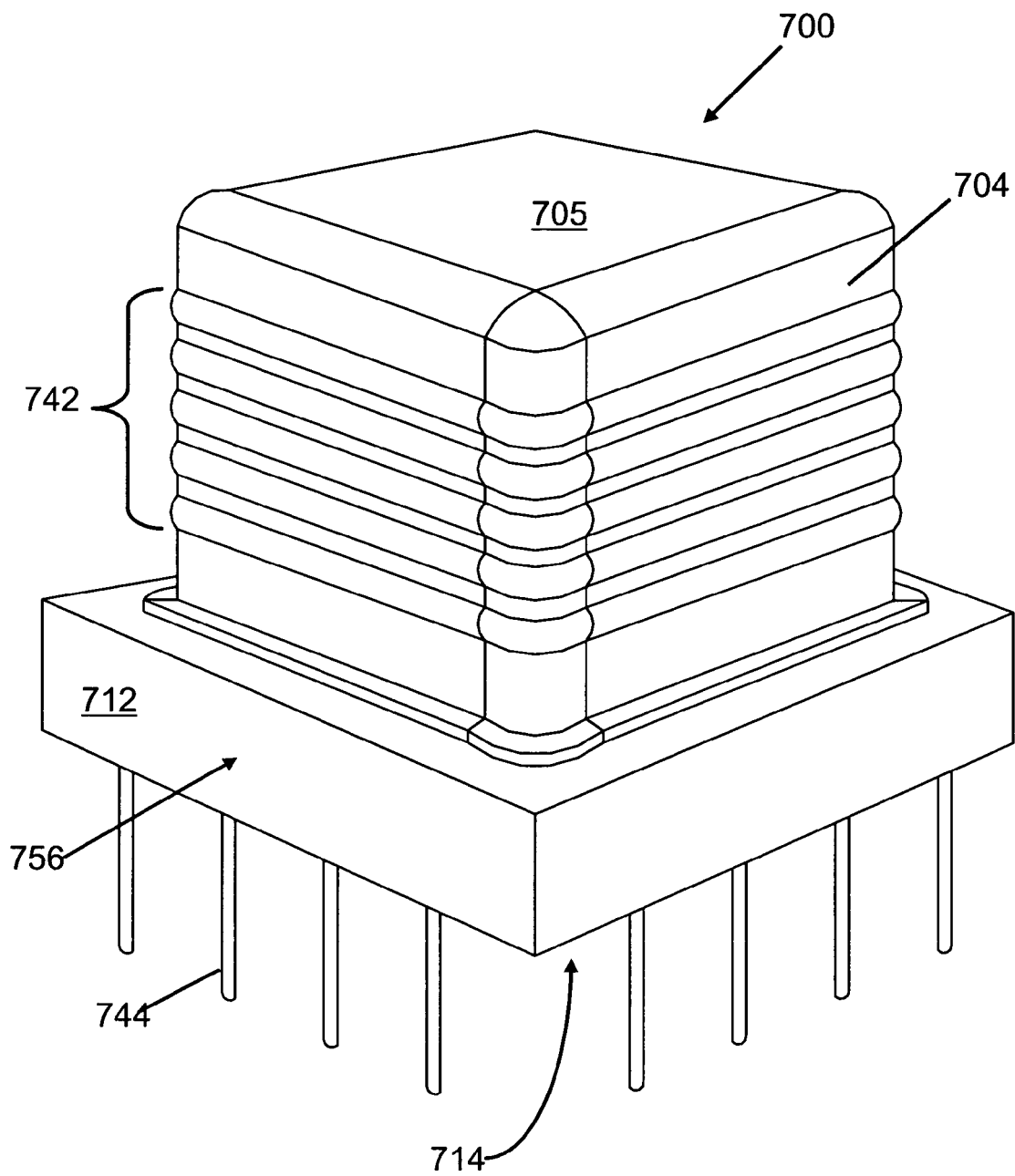
FIG. 7 is a schematic illustration of another embodiment of a MEMS fluidic actuator according to the present invention.

FIG. 7 is a schematic perspective view of another embodiment of a MEMS fluidic actuator 700 according to the present invention. The MEMS fluidic actuator 700 comprises a base 712 providing support for a bladder 705 that comprises an elastic membrane 704 having stiffening elements 742. The stiffening elements 742 can comprise regions of increased wall thickness, ribs or folds in the elastic membrane 704, and serve to reduce lateral movement, i.e. "ballooning" of the bladder 705 when the bladder 705 is pressurized (for example, stiffening elements 742 can be incorporated into the sidewalls of bladder 705). Stiffening elements 742 may also comprise wires, rings or hoops of materials having a higher elastic modulus than the elastic membrane 704. FIG. 7 also serves to illustrate an alternate method for electrical interconnection of the fluidic MEMS actuator 700 to an external controller (not shown) by way of contact pins 744. Access to fluidic channels 714 within the base 712, can be made for example, through the backside of base 712. The configuration of electrical connections 744 and access to fluidic channels 714 is conducive to applications where "backside" fluidic and electrical interconnections are desirable. The location of electrical and fluidic interconnections on the top, bottom or sides of base 712 would be expected to depend on the particular application of the invention. For example, electrical connections on a side 756 of base 712, could be made by a card edge connector (not shown) or similar electrical interconnection.

Figure 8:
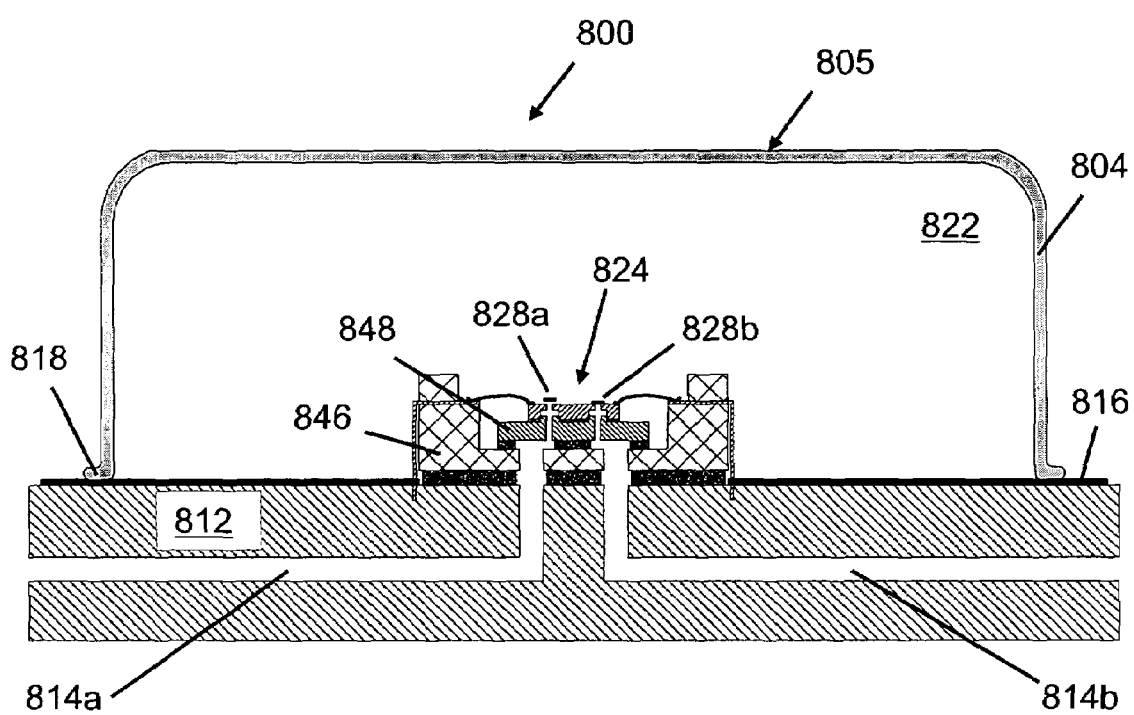
FIG. 8 is a schematic cross-section illustration of another embodiment of a MEMS fluidic actuator according to the present invention.

FIG. 8 is a schematic cross section view of another embodiment of a MEMS fluidic actuator 800 according to the present invention. In this embodiment, base 812 comprises separate fluidic channels, 814a and 814b, for admitting fluids to and exhausting fluids from, the internal volume 822 of bladder 805. A fluidic MEMS device 824, is housed in an electronic package 846, and comprises a MEMS pressure sensor (not in the plane of the present illustration), and MEMS valves 828a and 828b, for controlling the flow of fluid between the internal volume 822 and the fluidic channels 814a and 814b respectively. As illustrated in FIG. 8, valves 828a and 828b are acting as one-way valves, the actuation of which can be controlled by means of a controller (not shown) as described above.

Figure 9:
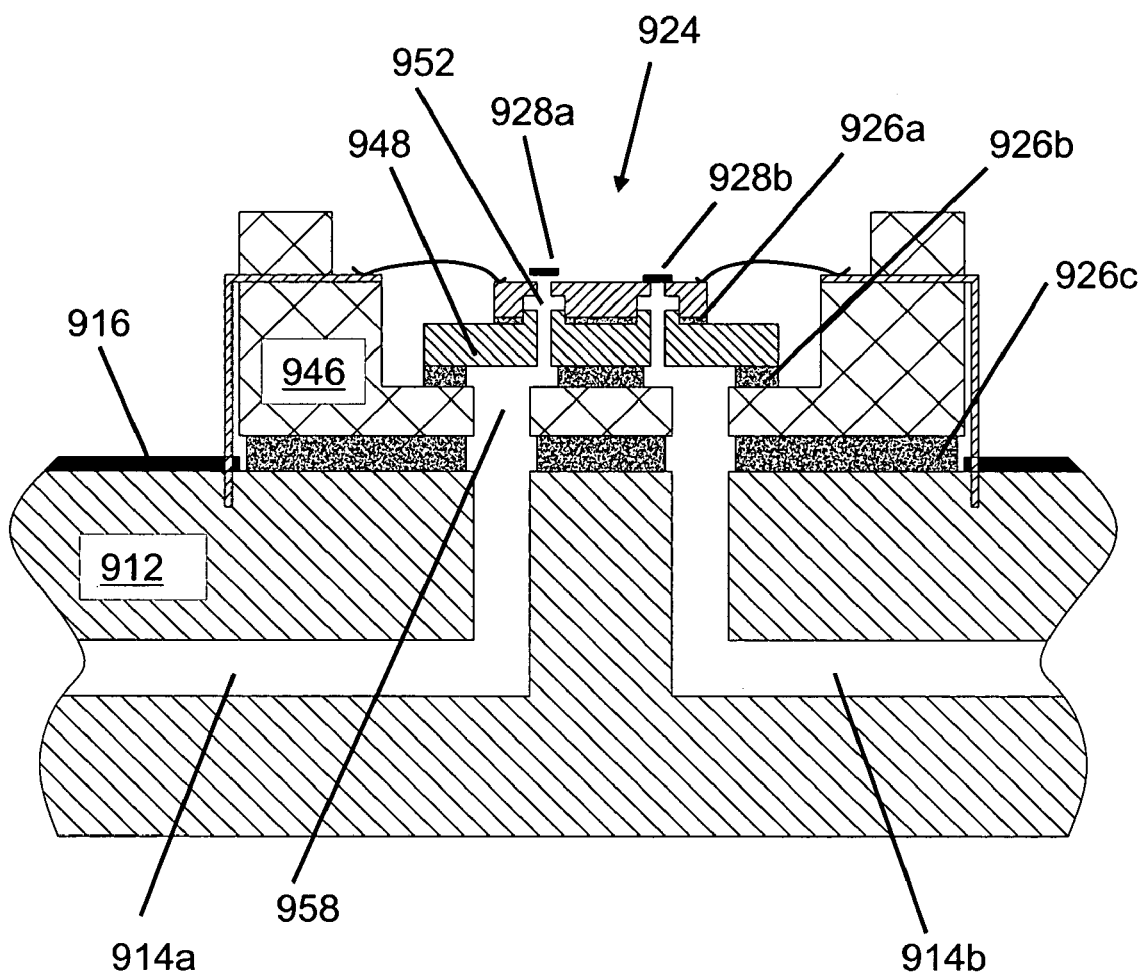
FIG. 9 is an enlarged schematic cross-section illustration of a MEMS fluidic actuator as shown in FIG. 8.

FIG. 9 is an enlarged schematic cross section of a microfluidic device 924 and a base 912, as illustrated in FIG. 8. Microfluidic device 924, is housed in an electronics package 946, illustrated here as a dual inline package or DIP, while any of a variety of electronic packages could be employed as well (for example; a ceramic dual in-line package, a single in-line package, a pin grid array a zigzag QUIP package, etc). The use of an electronic package 946 for housing the MEMS device 924 is a matter of convenience and, as described in the following, can serve to facilitate electrical and fluidic interconnections to the MEMS device 924. For a discussion of packaged fluidic MEMS devices, see U.S. Pat. No. 6,443,179 to Benavides et. al. Electronic package 946 can comprise fluidic channels 958, having dimensions on the order of the fluidic channels 914a and 914b within the substrate 912 (e.g. on the order of 500 μm). An interposer 948 can be employed to provide a fanout of the microfluidic ports 952 (typically on the order of 100 μm or less) on the device 924, to the fluidic channels 958 of the package 946, and eventually to the fluidic channels 914a and 914b within base 912. Fanout can be employed to facilitate assembly and alignment of small closely spaced microfluidic ports 952 to the generally larger in diameter and larger spacing of fluidic channels 958 that can be machined in the package 946, or the base 912. The interposer 948 can comprise a silicon, ceramic, glass, or composite substrate as described above for the base 912, or alternatively can be incorporated into a polymeric or adhesive layer, for example layer 926b. Adhesive layers 926a, 926b and 926c can be utilized respectively, to join the microfluidic device 924 to the interposer 948, the interposer 948 to the package 946 and the package to the base 912. Various embodiments of the adhesive layers 926a, 926b and 926c include those described above for adhesive layers.

Figure 10:
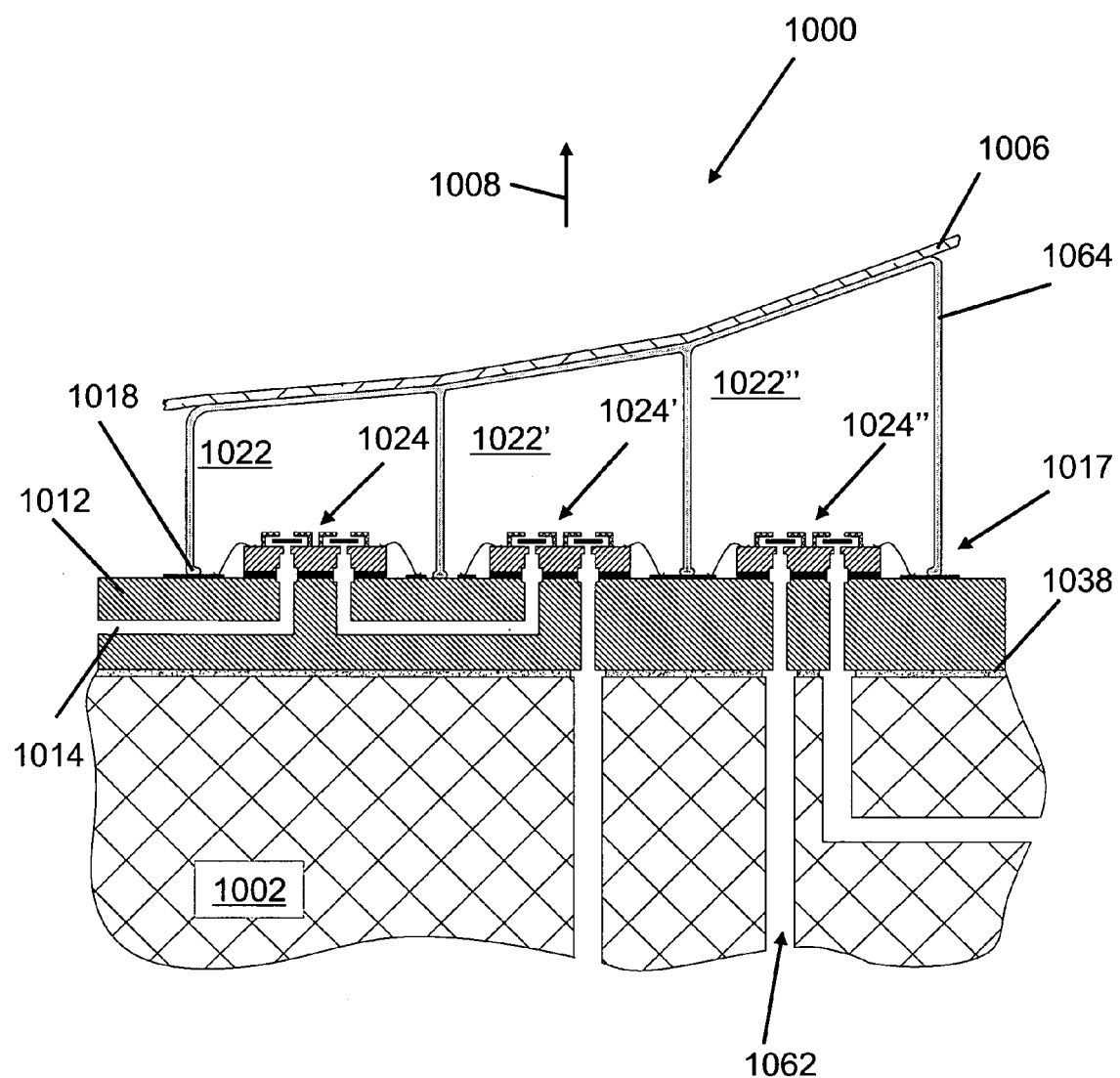
FIG. 10 is a schematic cross-section illustration of another embodiment of a system of MEMS fluidic actuators according to the present invention.

FIG. 10 is a schematic cross-section illustration of another embodiment of a system of MEMS fluidic actuators 1000, according to the present invention. A plurality of fluidic MEMS actuators having separate internal volumes 1022, 1022' and 1022", can be formed from a continuous elastic membrane 1064, for example, by molding the elastic membrane 1064 to produce multiple edges as sealing surfaces 1018, prior to attaching the elastic membrane 1064 to a base 1012. Each internal volume 1022, 1022', 1022", can contain a MEMS valve and a MEMS pressure sensor to allow independent monitoring of the pressure of fluid within each internal volume and independently controlling the exchange of fluid between each internal volume and fluidic channels 1014 within the base 1012.

By independently adjusting the pressure within each of the internal volumes 1022, 1022' and 1022", the extension and contraction of each bladder can be independently controlled and the displacement of a compliant cover 1006 adjusted to produce virtually any desired surface profile. The compliant cover 1006, contacting the elastic membrane 1064 can be included in applications where warranted. To facilitate the fluidic coupling and transport of fluid to and from the sealed volumes, fluidic channels 1062 may be incorporated into the substrate 1002. Adhesive and joining layers, for example layer 1038 joining base 1012 to substrate 1002, may comprise embodiments for adhesive and joining layers as described above.

Figure 11:
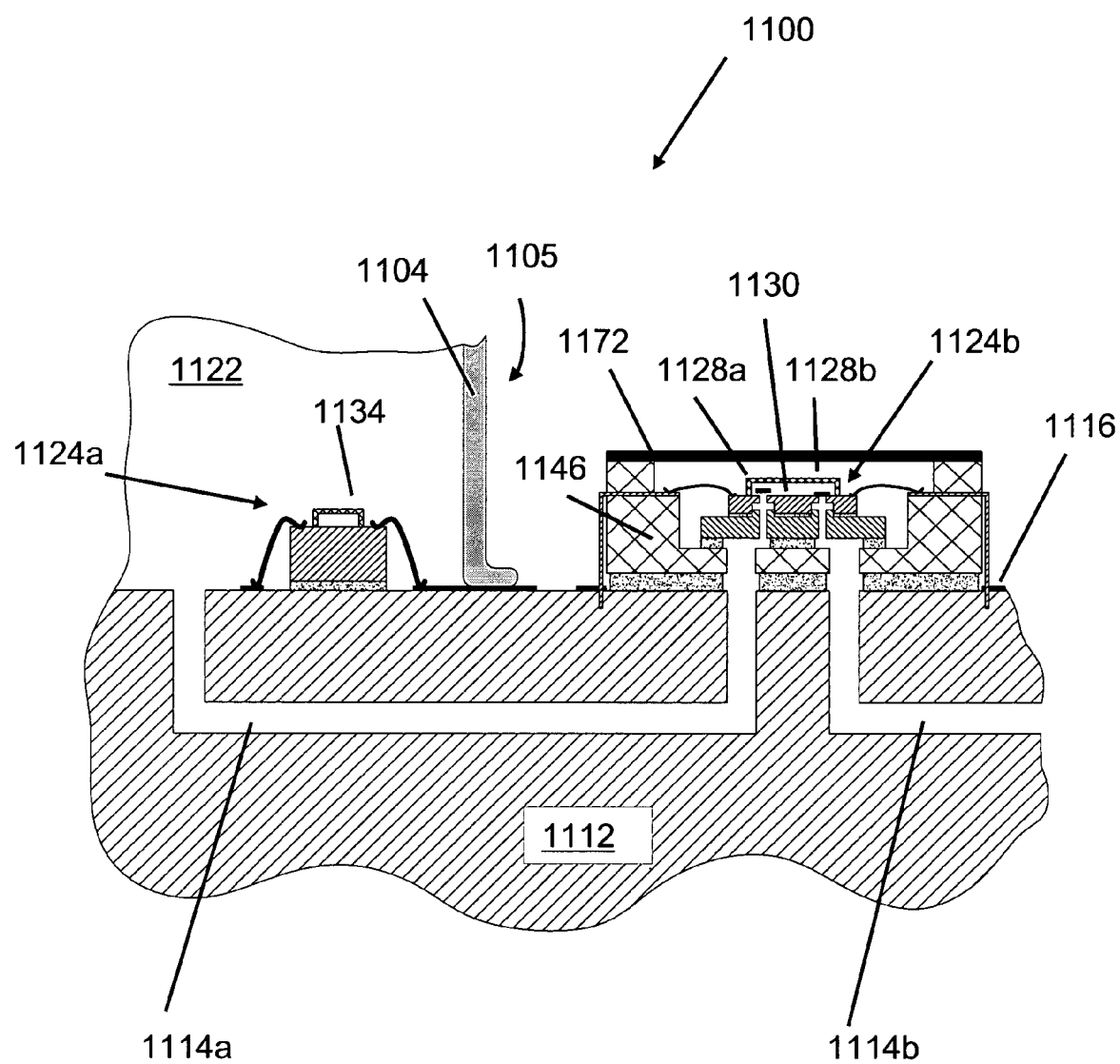
FIG. 11 is a schematic cross-section illustration of another embodiment of a MEMS fluidic actuator according to the present invention.

FIG. 11 is a schematic cross-section illustration of another embodiment of a fluidic MEMS actuator 1100 according to the present invention. FIG. 11 illustrates an actuator 1100 comprising a MEMS pressure sensing device 1134, disposed within a sealed volume 1122 of a bladder 1105, and one or more MEMS valves, 1128a and 1128b, located external to the bladder 1105. MEMS device 1124a, attached to base 1112, comprises a MEMS pressure sensor 1134, for measuring the pressure of a fluid within the bladder 1105. Base 1112 can comprise one or more fluidic channels 1114a and 1114b for admitting and exhausting fluid into and out of the bladder 1105. MEMS device 1124b is housed within an electronics package 1146, attached to base 1112 and located external to the sealed volume 1122 of bladder 1105. MEMS device 1124b comprises a fluidic channel 1130, interconnected to the fluidic channels 1114a and 1114b in base 1112 by means of an electronic package 1146, as described above. MEMS valves 1128a and 1128b are disposed along the channel 1130 in device 1124b and are operated to control the flow of fluid between channels 1114a and 1114b and the sealed volume 1122 within bladder 1105. Electronics package 1146 can comprise a lid or cover 1172, to provide physical protection of MEMS device 1124b from the environment.

Other applications and variations of the present invention will become evident to those skilled in the art. For example the MEMS valves and MEMS sensors can be integrated into a singular die or alternatively, MEMS valves and MEMS sensors can comprise multiple silicon dies. The silicon dies may or may not be housed in electronic packages, depending on the application. Embodiments of a system of MEMS fluidic actuators can include a plurality of any individual embodiment of a MEMS fluidic actuator, or any combination of the individual embodiments as described and illustrated above. Additionally, other embodiments are envisioned where multiple actuators can be arranged on both the front and back surfaces of a base or substrate.

The description of the invention set forth in the foregoing specification and drawings is offered by way of illustration only and not as a limitation. The actual scope of the invention is intended to be defined in the following claims, when viewed in their proper perspective based on the foregoing specification and drawings.

What is claimed is:

1. A fluidic MEMS actuator comprising:
a bladder, said bladder comprising an elastic membrane and said bladder includes means for attaching said elastic membrane, along a perimeter edge of said elastic membrane, to a base;
a MEMS sensor operatively configured to measure at least one of the pressure of a fluid within said bladder or, at least one parameter related to the flow rate of a fluid, into or out of said bladder;
a MEMS valve operatively configured to control the amount of fluid within said bladder;
wherein at least one of said MEMS sensor and said MEMS valve, is disposed within said bladder.

2. The actuator of claim 1 wherein said base comprises one or more selected from the group consisting of a laminate printed wiring board, a ceramic, a glass ceramic, a co-fired ceramic and a glass-coated metal.

3. A system of MEMS fluidic actuators comprising:
a substrate;
a plurality of fluidic MEMS actuators attached to at least one surface of said substrate, each fluidic MEMS actuator of said plurality comprising:
a bladder;
a MEMS sensor operatively configured to measure at least one of the pressure of a fluid within said bladder or, at least one parameter related to the flow rate of a fluid, into or out of said bladder;
a MEMS valve operatively configured to control the amount of fluid within said bladder;
wherein at least one of said MEMS sensor and said MEMS valve, is disposed within said bladder; and,
a compliant cover being displaceable by one or more said bladders of said plurality of fluidic MEMS actuators.

4. The system of claim 3 wherein said compliant cover comprises one or more selected from the group consisting of an elastomeric polymer, a rubber, a fabric, a silk, a polymer composite, and a metallic sheet.

5. A system of MEMS fluidic actuators comprising:
a substrate;
a plurality of fluidic MEMS actuators attached to at least one surface of said substrate, each fluidic MEMS actuator of said plurality comprising:
a bladder;
a MEMS sensor operatively configured to measure at least one of the pressure of a fluid within said bladder or, at least one parameter related to the flow rate of a fluid, into or out of said bladder;
a MEMS valve operatively configured to control the amount of fluid within said bladder;
wherein at least one of said MEMS sensor and said MEMS valve, is disposed within said bladder; and,
wherein one or more said bladders each comprise an individual elastic membrane, attached along a perimeter edge, to a surface of said substrate.

6. A system of MEMS fluidic actuators comprising:
a substrate;
a plurality of fluidic MEMS actuators attached to at least one surface of said substrate, each fluidic MEMS actuator of said plurality comprising:
a bladder;
a MEMS sensor operatively configured to measure at least one of the pressure of a fluid within said bladder or, at least one parameter related to the flow rate of a fluid, into or out of said bladder;
a MEMS valve operatively configured to control the amount of fluid within said bladder;
wherein at least one of said MEMS sensor and said MEMS valve, is disposed within said bladder; and,
wherein one or more said bladders, comprise a continuous elastic membrane, having a plurality of bladders formed therein.

7. A system of MEMS fluidic actuators comprising:
a substrate;
a plurality of fluidic MEMS actuators attached to at least one surface of said substrate, each fluidic MEMS actuator of said plurality comprising:
a bladder;
a MEMS sensor operatively configured to measure at least one of the pressure of a fluid within said bladder or, at least one parameter related to the flow rate of a fluid, into or out of said bladder;

a MEMS valve operatively configured to control the amount of fluid within said bladder;

wherein at least one of said MEMS sensor and said MEMS valve, is disposed within said bladder; and, said substrate includes one or more fluidic channels, at least one fluidic channel being fluidically connected to one or more bladders.

8. A system of MEMS fluidic actuators comprising:

a substrate;

a plurality of fluidic MEMS actuators attached to at least one surface of said substrate, each fluidic MEMS actuator of said plurality comprising:

a bladder;

a MEMS sensor operatively configured to measure at least one of the pressure of a fluid within said bladder or, at least one parameter related to the flow rate of a fluid, into or out of said bladder;

a MEMS valve operatively configured to control the amount of fluid within said bladder;

wherein at least one of said MEMS sensor and said MEMS valve, is disposed within said bladder; and, wherein said plurality of fluidic MEMS actuators are adjacently spaced, so as to allow at least one sidewall of the corresponding bladder of at least one said MEMS actuator, to touch at least one adjacent sidewall of the corresponding bladder of at least one neighboring actuator.

* * * * *